Sept. 18, 1956 J. McC. BRUMBAUGH 2,763,833
TELEVISION FILM RECORDING
Filed April 13, 1953
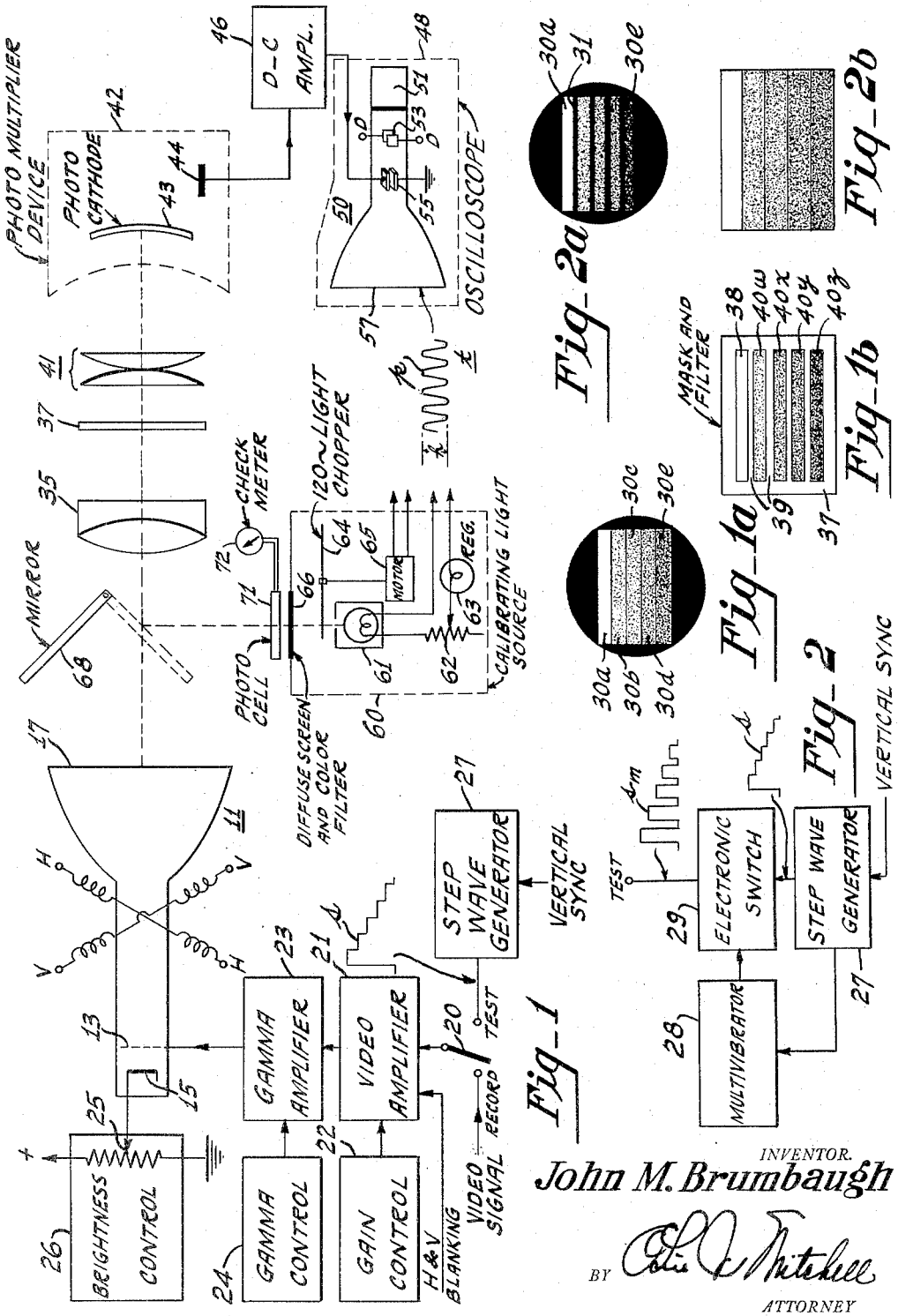
INVENTOR.
John M. Brumbaugh
BY
ATTORNEY United States Patent Office 2,763,833
Patented Sept. 18, 1956

2,763,833

TELEVISION FILM RECORDING

John McCall Brumbaugh, Lansdowne, Pa., assignor to Radio Corporation of America, a corporation of Delaware Application April 13, 1953, Serial No. 348,165

18 Claims. (Cl. 324—20)

This invention relates to television film recording systems and more particularly to test apparatus for such recording systems.

In the operation of recording television picture information on film it is necessary to predetermine the transfer characteristic of the recording kinescope and associated circuitry, and to accordingly adjust circuit components where the indicated response of the kinescope to various levels of video input signal does not accord with a desired relationship of light output to signal input. Whereas it may often be desirable for such test purposes to obtain a sweep indication of the response of the kinescope over the anticipated range of video signal levels there are several difficulties which may arise to render this type of testing impractical and inaccurate, particularly where the recording kinescope has a phosphor with an appreciable decay time. Since the decay characteristic of the phosphor is a non-linear function with respect to time, the factor of overlap of light output from the kinescope screen for preceding signal input levels renders the problem of accurately indicating the response of the kinescope to continuously changing signal levels quite complex.

The present invention, however, rather than obtaining a continuous transfer characteristic indication, provides for intervals of indication of predetermined steps within the anticipated video signal range, whereby an equilibrium condition of phosphor decay may be obtained for each input signal level for which the kinescope response is to be indicated. A more accurate indication of the actual kinescope response to at least the selected levels within the anticipated range is thus obtained. Moreover, the present invention may include means for permitting substantially complete decay of the phosphor between the periods of indication of the selected levels. The deleterious effects of phosphor persistence on the response indications are thus substantially eliminated.

Moreover, the present invention achieves this accurate indication of kinescope response using apparatus which is simple, facile in operation, and easily adapted to permit adjustment of the system components (e. g., a gamma amplifier or gradient corrector) to obtain a response which accords with any of a variety of desired transfer characteristics.

In accordance with a form of the invention, a test pattern raster is developed on the screen of the recording kinescope, the raster comprising a series of bands of different intensity arranged in decreasing light intensity order. A light translating device, preferably of the photomultiplier type, is adapted to receive light emanating from the kinescope screen as the test pattern raster is developed. A wave shape indicating means, such as an oscilloscope, produces a visual display of the wave shape of the photomultiplier's output signal. An array of filter elements of progressively increasing density is interposed in the light path from the kinescope screen to the light responsive electrode of the photomultiplier. The test pattern raster is imaged on the filter array so that light from the brightest band passes through the filter of greatest density, the light from the band of penultimate brightness passes through the filter of penultimate density, etc. The densities of the respective filter elements are chosen with respect to the desired kinescope light output for the respective bands so that for a prescribed set of voltage steps in the input signal, passage of an equal amount of light flux through all the filter elements will be indicative of achievement of the desired transfer characteristic. Thus, when the wave shape of the photomultiplier output, as indicated on the oscilloscope screen, comprises a series of pulses of equal amplitude, accord with the desired transfer characteristic is accurately indicated.

A form of the present invention also provides means for calibrating the wave shape indication on the oscilloscope screen in accordance with a reference source of light so that the "D.-C level" of the kinescope response as well as the characteristic shape will accord with desired recording conditions.

It is therefore a primary object of the present invention to provide novel and improved transfer characteristic testing apparatus for television film recording systems.

Another object of the present invention is to provide simple and easily operable apparatus for determining and adjusting the response of a recording kinescope to video input signals.

It is a further object of the present invention to provide a television film recording system with transfer characteristic testing apparatus wherein accurate indications of the response of a recording kinescope to video input signals are obtained without ambiguities due to phosphor persistence.

An additional object of the present invention is to provide test apparatus whereby distortions of the response of a recording kinescope from a desired transfer characteristic and appropriate corrections thereof are readily indicated.

Other and incidental objects and advantages of the present invention will be readily apparent to those skilled in the art after a reading of the following description and an inspection of the accompanying drawings in which:

Figure 1 illustrates in block and schematic form apparatus for testing and controlling the transfer characteristic of a television recording channel in accordance with an embodiment of the invention.

Figure 1(a) illustrates one form of a test pattern raster which may be employed in the embodiment of the invention illustrated in Figure 1.

Figure 1(b) illustrates a combination filtering and masking means which may be employed in the embodiment of the invention illustrated in Figure 1.

Figure 2 illustrates in block form a modification of a portion of the embodiment illustrated in Figure 1, which may be employed in accordance with the principles of the present invention relating to the elimination of phosphor persistence effects.

Figure 2(a) illustrates a form of a test pattern raster which may be developed in accordance with the modification illustrated in Figure 2.

Figure 2(b) illustrates a filter array which may be employed in testing apparatus subject to the modification illustrated in Figure 2.

Referring first to Figure 1, a recording kinescope 11 of a conventional type is illustrated. The kinescope 11 is provided with a conventional electron gun structure (partially illustrated), including a cathode 15 and a control grid 13; appropriate beam focusing and accelerating means (not illustrated); deflection coils HH and VV adapted to be energized at conventional line and field frequencies; and a luminescent screen 17 upon which scanning rasters are developed. The kinescope input circuit associated with the cathode 15 and the control grid 13 includes a video input channel and a plurality of signal controls. A brightness control 26 for the recording kinescope 11 is provided. The brightness control 26 may, for example, comprise a potentiometer 25 coupled to a source of bias potential, the variable tap of the potentiometer 25 being connected to the kinescope cathode 15. Signals are applied to the control grid 13 through a video input channel which includes switch 20, the video amplifier 21 and a gradient correcting or so-called "gamma" amplifier 23. Means for controlling the gain in the video amplifier 21, and for controlling the correction or amplitude distortion in gamma amplifier 23, are indicated in the drawing by the block representations of a gain control 22 and a gamma control 24.

The switch 20 is adapted to connect the video input channel either to a source of video signals to be recorded (i. e., at the terminal labeled "record") or to connect the video input channel to a test signal source, the step wave generator 27 (i. e. at the terminal labeled "test"). The step wave generator 27, synchronized in its operation by the application of conventionally derived vertical sync pulses, is adapted to provide a field frequency wave "s," which comprises a plurality of discrete steps of progressively decreasing amplitudes.

As is conventional, horizontal and vertical blanking pulses developed in the usual manner, are applied to the video input channel during recording or test operations to blank out the return scans of the kinescope beam during the usual horizontal and vertical retrace intervals. During recording operations, these blanking pulses may, if desired, be included in the video signal applied to the "record" terminal.

A light path for the light emanating from the screen 17 is provided, including a lens system 35, a slotted mask 37, an additional lens system 41, and terminating with the light responsive electrode 43 of a light translating device 42. The light translating device 42 may preferably be a tube of the photomultiplier type, having a photocathode 43, a plurality of electron multiplier electrodes or dynodes (not illustrated), and a collector or anode 44. The electrical signal output developed by the photomultiplier 42 is amplified in a D.-C. amplifier 46 (or, alternatively, in an A.-C. amplifier, provided with a suitable D.-C. level setter) coupled to the anode 44.

Wave shape indicating means, such as an oscilloscope 48, are provided for visually displaying the wave shape of the signal developed in photomultiplier 42. As illustrated, the oscilloscope may be of a conventional type including a cathode ray tube 50 having a conventional electron gun structure 51, horizontal deflection plates 53, vertical deflection plates 55, a luminescent screen 57, and other conventional components not illustrated. The output of the D.-C. amplifier 46 is applied across the vertical deflection plates 55 to control the vertical deflection of the oscilloscope beam in accordance with the amplitude of the photomultiplier output signal. The horizontal deflection plates 53 are adapted to be connected at terminals DD to a suitable scanning wave source. The frequency of the scanning waves applied to the oscilloscope's horizontal deflection plates 53 is preferably equal to, or a submultiple of, the kinescope field frequency.

A retractable mirror 68, which is normally held back from the light path between the luminescent screen 17 and the photocathode 43, may be depressed to occupy the position indicated by the dotted lines on the drawing. In this depressed position the mirror 68 is adapted to reflect light from a calibrating light source 60 into the light path terminating at the photocathode 43. As illustrated the calibrating light source 60 may include a suitably shielded light bulb 61, the filament of which is supplied with an energizing current of adjustable amplitude.

Means for adjusting the energization of the light bulb 61 may take the form of the rheostat 62 which is included in one of the connections between the filament of the bulb 61 and a suitable source of D.-C. current. A regulator tube 63 may also be included in this connection to insure a constant supply at the adjusted value. The light emitted by the shielded bulb 61 is interrupted at a rate of 120 cycles per second by means of a light chopper 64 which may comprise a suitably shaped disc adapted to be driven by the motor 65. The chopped light is directed toward the mirror 68 through a screen 66 which acts to diffuse the light passing therethrough and also serves as a color filter. A photocell 71 coupled to a check meter 72 may also be provided to obtain a check on the intensity of light emitted by the calibrating light source 60.

In operation, calibration of the oscilloscope deflection is first effected by placing the mirror 68 in its depressed position, energizing the light bulb 61 with a desired magnitude of current, energizing the motor 65 to cause a 120 cycle chopping of the light emitted from bulb 61 and noting the resultant amplitude of the pulses appearing in the trace on screen 57 of the oscilloscope 48. If a reading of the check meter 72 indicates that the light emitted by the calibrating source 60 is of the desired reference value, then the deflection amplitude noted on the screen 57 may be considered as the desired reference deflection.

The mirror 68 is then retracted from the light path and the calibrating light source 60 may be de-energized. The switch 20 is thrown to the "test" position and step waves "s" are applied through amplifiers 21 and 23 to the control grid 13 to control the intensity of the kinescope beam. With the deflection coils HH and VV energized at their respective rates, a scanning raster is developed on screen 17 which will have the general form illustrated in Figure 1a.

That is, the developed raster will comprise a succession of bands of light of progressively decreasing intensity; a maximum "white" band 30a at the top of the raster, a "picture black" band 30e at the bottom of the raster and "gray" gradation bands 30b, 30c, and 30d in the appropriate intermediate positions. The lens system 35 focuses an inverted image of the raster illustrated in Figure 1a upon the slotted mask 37.

The mask 37 may, as illustrated in Figure 1b, comprise an opaque body having slotted openings 38 separated by opaque strips 39. A plurality of light filter elements 40 of different densities are mounted in the slots 38 with the exception of the uppermost one. The filter elements 40 are arranged in the slots in order of increasing density, i. e. the filter of lowest density 40W toward the top, the filter element 40Z of greatest density at the bottom and the filter elements 40X and 40Y of intermediate densities therebetween. Since the raster image which is focused on mask 37 is inverted, light emanating from the brightest band 30a is focused on the filter 40Z of greatest density, the band 30b of penultimate brightness is focused on the filter element 40Y of penultimate density, etc. The band 30e of least intensity, corresponding to "picture black," is focused on the uppermost of the slots 38, which as indicated, contains no filter element.

Light passing through the various filter elements 40 and the uppermost "open" slot 38 as the scanning raster is developed is diffused over the surface of the photocathode 43 by virtue of the lens system 41. Since the opaque strips 39 of the mask 37 periodically interrupt the flow of light to the photocathode 43 at intervals occurring between the periods of light passage through the respective filter elements 40, the wave shape of the signal developed in the photomultiplier 42 will comprise a series of pulses. The respective amplitudes of these pulses will depend upon the amount of light flux passed by each of the respective open or filtered slots 38.

By choosing the density of the various filter elements 40W, 40X, etc. with appropriately inverse relation to the desired kinescope brightness for the respectively associated levels of video signal input represented in the step wave "$s$," agreement of the kinescope response with the desired transfer characteristic form will be indicated by passage of an equal amount of light flux through each of said filter element 40 (and through the open slot 38), and thus by the equalization in amplitude of the pulses displayed on oscilloscope screen 57.

Thus, if the trace on the oscilloscope screen 57 is in the form of the wave "$t$" illustrated in the drawing, i. e. where all the pulses "$p$" are of the same amplitude "$h$," the desired transfer characteristic shape has been achieved. Further, if this amplitude "$h$" is equal to, or of the desired relation to, the reference amplitude of deflection determined in the calibration procedure, the "D.-C. level" of the kinescope response is also as desired.

If, however, the pulses "$p$" developed in the trace on the oscilloscope screen 57 are not all equal and of the same amplitude as, or in the desired relation to, the reference amplitude of deflection, the operator may adjust the various signal controls associated with the recording kinescope 11 and its video input channel until equalization of the pulse amplitudes of the oscilloscope trace at the desired level is effected. These signal controls may, as indicated in the drawing, include a video gain control 22, a gamma control 24, and a brightness control 26. Thus, the operator may, by controlling the gain in the video amplifier 21, the amplitude distortion introduced by the correcting or gamma amplifier 23, and the kinescope bias, adjust the signal contrast, gamma, and D.-C. level in the recording system until achievement of a desired recording system transfer characteristic is accurately indicated by pulse equalization at a reference level on the oscilloscope screen 57.

It will be readily appreciated that the use of a step function test signal as opposed to the use of a continuously changing test signal has the advantage of obtaining an indication of the kinescope response to a given level of video input signal at an equilibrium condition of phosphor decay. It will be further appreciated that the use of the mask 37 as a means to interrupt the flow of light from the screen 17 to the photocathode 43 at intervals between the periods of indication for the respective raster bands 30 provides as a further advantage that a period sufficient to permit substantially complete phosphor decay exists before the start of light collection by the photocathode 43 from each of the different level-representative bands 30. The necessary width of each opaque strip 39 incorporated in the mask 37 logically depends upon the persistence properties of the phosphor employed on the kinescope screen 17, but may generally be of a magnitude sufficient to provide interruption intervals of the order of several line intervals. In lieu of the use of the mask 37 as the periodic light interrupting means, the interruptions may be performed electronically. For example, the step wave "$s$" may be so modified in its generation or subsequent handling as to return the signal amplitude to a beam cut-off level for a suitable interval between each successive step.

An example of an arrangement for performing this modifying operation is the combination illustrated in Figure 2, which may be substituted for the simple step wave generator 27 as used in Figure 1. As shown in Figure 2, an electronic switch 29 is provided in the connection between the step wave generator 27 and the "test" terminal of the switch 20. The electronic switch 29 is adapted to alternately pass or block the passage of the signal output of the step wave generator 27 to the test terminal under the control of the multivibrator 28. The multivibrator 28 may be of a conventional monostable type and adapted to operate in response to the "risers" of the step wave output "$s$" of generator 27 to close the electronic switch 29 for a short interval at the beginning of each step in the output wave "$s$." It will be appreciated that the combination illustrated in Figure 2 is but one of a variety of possible arrangements which may be employed to modify the step wave output of a generator 27 to provide a chopped step wave output such as shown in Figure 2 by the wave form "$s_m$."

When step wave modifying means such as that shown in Figure 2 are employed in the combination shown in Figure 1, the raster developed on the screen 17 will take the general form illustrated in Figure 2$a$. Thus, the developed raster will again comprise a succession of different level-representative bands of light ranging from a maximum "white" band 30$a$ at the top of the raster to a "picture black" band 30$e$ at the bottom of the raster, but will be modified to the extent that a black no-signal band 31 separates each of the level-representative bands 30 from the bands adjacent thereto.

When the periodic light interruptions are effected electronically, as by use of step wave modifying means such as that illustrated in Figure 2, the filter elements 40 need not be mounted in a slotted mask structure 37 but may be arrayed as illustrated in Figure 2$b$.

It should be noted that where a change in recording conditions, the nature of signals to be recorded, desired artistic effects, etc. dictates a change in the transfer characteristic desired, the new recording transfer characteristic may be achieved with accuracy by simply changing the array of filter elements 40 to an array of filter elements which accord with the new light output-to-signal input relationship desired, obtaining a new trace indication on the oscilloscope screen 57, and accordingly adjusting the various signal controls associated with the kinescope 11.

It is thus not necessary that the operator make a new set of precise measurements each time the transfer characteristic requirements are changed, for if the appropriate one of a previously prepared set of filter arrays is selected and inserted in the light path, the operator need only readjust the signal controls associated with the recording kinescope so that the pulse amplitudes on the oscilloscope screen 57 are again equalized at the desired reference deflection amplitude.

It should also be noted that where it is desired to retain the same general shape of the transfer characteristic but it is desired to change the "D.-C. level" so that the absolute values of brightness at all points of the transfer characteristic are equally raised or lowered, the reference value of light emitted by the calibrating light source 60 may be changed, as by adjusting rheostat 62, so that the reference amplitude of deflection "$h$" to which the peaks of the pulses "$p$" are brought is changed. Of course, where the change in recording conditions, etc. requires both changes in the shape and D.-C. level of the transfer characteristic, appropriately related changes in the filter array and the reference light value may be conjointly made.

While the form of the step wave "$s$" and its modification "$s_m$" were illustrated in the drawings as comprising steps in a progression of decreasing amplitudes, step waves comprising steps progressing in an order of increasing amplitudes may be alternatively employed. However, the use of the decreasing progression is deemed to be the more desirable since the development of a black band 30$e$ then occurs at a time separated from the conclusion of the prior development of a peak white band 30$a$ by almost a complete field interval. If, on the other hand, the increasing progression is employed, the development of the black band 30$e$ will be separated from the conclusion of the development of the peak white band 30$a$ by only a short time interval corresponding to the vertical retrace period.

It may further be noted that the optical system shown in Figure 1 is preferably set at a slight angle from the axis of the recording kinescope so as not to obstruct the field of the recording camera lens.

What is claimed is:

1. In a television film recording system including a recording kinescope having a luminescent screen and a beam intensity control electrode, and beam deflection means associated with said kinescope and energized at predetermined line and field frequencies for developing a scanning raster on said screen, the combination comprising means for generating a field-frequency stepped wave, each cycle of said wave comprising a plurality of discrete steps of predetermined different amplitudes relative to a beam cut-off level, means for applying said stepped wave to said beam intensity control electrode, a light translating device having a light responsive electrode, said light responsive electrode being disposed so as to receive light emanating from said screen as said scanning raster is developed, scanning means for visually displaying the wave shape of the output signal of said light translating device, a light filter comprising a plurality of filter elements of different densities interposed in the light path from said screen to said light responsive electrode, and means for focusing an image of said raster upon said filter.

2. Apparatus in accordance with claim 1 wherein said combination also includes means for periodically interrupting the flow of light from said screen to said light responsive electrode at discrete intervals during the development of each scanning raster, the duration of each of said intervals corresponding to the duration of at least one cycle of said line frequency.

3. Apparatus in accordance with claim 2 wherein said interrupting means comprises means for modifying said stepped wave so as to periodically return the amplitude of said wave to said beam cutoff level.

4. Apparatus in accordance with claim 2 wherein said interrupting means comprises a slotted mask interposed in said light path.

5. Apparatus in accordance with claim 4 wherein said filter elements are respectively disposed in the slots of said mask.

6. In a television film recording system including a recording kinescope having a luminescent screen and a beam intensity control electrode, an input circuit coupled to said control electrode, and beam deflection means associated with said kinescope and energized at predetermined line and field frequencies for developing a scanning raster on said screen, the combination comprising means for generating a field frequency stepped wave, each cycle of said wave comprising a plurality of discrete steps of predetermined different amplitudes relative to a beam cutoff level, means for applying said stepped wave to said input circuit whereby the raster developed on said screen comprises a plurality of parallel bands having respectively different light intensities, the light intensities of said bands progressing in a predetermined direction in discrete steps from a minimum value to maximum value, a light translating device having a light responsive electrode, said light responsive electrode being disposed so as to receive light emanating from said screen as said scanning raster is developed, beam scanning means for visually displaying the wave shape of the output signal of said light translating device, a light filter comprising a plurality of parallel filter strips of respectively different densities interposed in the light path from said screen to said light responsive electrode, the densities of said filter strips progressing in said predetermined direction in discrete steps from a minimum value to a maximum value, and means for focusing an inverted image of said raster upon said filter whereby light from each of said bands passes through only a respective one of said filter strips.

7. Apparatus in accordance with claim 6 wherein said combination also includes means for periodically interrupting the flow of light from said screen to said light responsive electrode at discrete intervals during the development of a scanning raster, the duration of each of said intervals corresponding to the duration of at least one cycle of said line frequency.

8. In a television film recording system including a recording kinescope having a luminescent screen and a beam intensity control electrode, an input circuit coupled to said control electrode, a plurality of signal controls associated with said input circuit, and beam deflection means energized at predetermined line and field frequencies for developing a scanning raster on said screen, the combination comprising, means for generating a field frequency stepped wave, each cycle of said wave comprising a plurality of discrete steps of predetermined different levels relative to a beam cutoff level, means for applying said stepped wave to said input circuit whereby the raster developed on said screen comprises a plurality of parallel bands having respectively different light intensities, the light intensities of said bands progressing in a predetermined direction in discrete steps from a minimum value to a maximum value, a light translating device having a light responsive electrode, said light responsive electrode being disposed so as to receive light emanating from said screen, an oscilloscope including a screen, beam forming means, and beam deflection means for developing a beam trace on said screen, means for applying the signal output of said light translating device to said deflection means to control the deflection of said beam trace in one scanning direction in accordance with the amplitude of said signal output, a light filter comprising a plurality of parallel filter strips of respectively different densities interposed in the light path from said screen to said light responsive electrode, the densities of said filter strips progressing in said predetermined direction in discrete steps from a minimum value to a maximum value, means for focusing an inverted image of said raster upon said filter whereby light from each of said bands passes through only the respective complementally-positioned one of said filter strips, said signal controls being adapted to adjust said input circuit so that the amplitude of the oscilloscope beam deflection in said one scanning direction is the same for each portion of the signal output of said translating device corresponding to the light emanating from each of said bands.

9. Apparatus in accordance with claim 8 wherein said combination also includes means for periodically interrupting the flow of light from said screen of said light responsive electrode at discrete intervals during the development of a scanning raster, the duration of each of said intervals corresponding to the duration of at least one cycle of said line frequency.

10. Apparatus in accordance with claim 8 wherein there is also provided means for calibrating the oscilloscope beam deflection in said one scanning direction.

11. In a television film recording system including a recording kinescope having a luminescent screen and a beam intensity control electrode, a video input channel coupled to said control electrode and a plurality of signal controls associated with said input channel, transfer characteristic testing apparatus comprising the combination of means for developing on said screen a test pattern raster, the light emanating from respective portions of said raster representing the response of said kinescope to respectively different predetermined levels of video signal input to said video channel, a plurality of light attenuating elements, each of said attenuating elements being disposed to attenuate the light emanating from a respectively different one of said raster portions, the light attenuating factor of each of said elements being chosen relative to the video signal input level represented by the raster portion with which each said element is associated so that an equal amount of light flux is passed by all of said elements when the response of the kinescope accords with a desired transfer characteristic.

12. Apparatus in accordance with claim 11 wherein said combination also includes means for obtaining successive indications of the amount of light flux passed by each of said attenuating elements whereby a predetermined transfer characteristic is obtained by adjusting said signal controls until all said successive light flux indications are equal.

13. Apparatus in accordance with claim 12 wherein said plurality of signal controls include means for effecting brightness, contrast and gamma adjustments in said video input channel.

14. In a television film recording system including a recording kinescope having a luminescent screen and a beam intensity control electrode, and a video input channel coupled to said control electrode, transfer characteristic testing apparatus comprising the combination of means for developing on said screen a test pattern raster, the light emanating from respective portions of said raster representing the response of said kinescope to respectively different predetermined levels of video signal input to said video channel, a plurality of filter elements of respectively different densities, each of said filter elements being disposed to attenuate the light emanating from a respectively different one of said raster portions, the density of each of said filter elements being inversely proportional to the desired light response of said kinescope for the respective video signal input level represented by the raster portion with which each said element is associated.

15. Apparatus in accordance with claim 14 wherein said combination includes means for obtaining successive indications of the amount of light flux passed by each of said filter elements.

16. Apparatus in accordance with claim 15 wherein said combination also includes means for controlling said video input channel to obtain equalization of all of said successive light flux indications.

17. Apparatus in accordance with claim 16 wherein said controlling means includes means for adjusting the D.-C. level, gain, and gamma in said video input channel.

18. Apparatus in accordance with claim 17 wherein said combination also includes means for pre-calibrating said indicating means.

References Cited in the file of this patent

UNITED STATES PATENTS

| | | |
|---|---|---|
| 2,223,008 | Michaelis | Nov. 26, 1940 |
| 2,460,471 | Schade | Feb. 1, 1949 |

FOREIGN PATENTS

| | | |
|---|---|---|
| 65,540 | Denmark | Aug. 25, 1947 |